(12) United States Patent
Brunbauer et al.

(10) Patent No.: US 8,092,206 B2
(45) Date of Patent: Jan. 10, 2012

(54) INJECTION UNIT FOR AN INJECTION MOLDING MACHINE

(75) Inventors: Klaus Brunbauer, Bad Voeslau (AT);
Franz Wilfing, Mattersburg (AT);
Andreas Lechner, Pottenstein (AT);
Bernhard Zoehling, Hoelles (AT)

(73) Assignee: Wittmann Battenfeld GmbH, Kottingbrunn (AU)

( * ) Notice: Subject to any disclaimer, the term of this patent is extended or adjusted under 35 U.S.C. 154(b) by 35 days.

(21) Appl. No.: 12/755,602

(22) Filed: Apr. 7, 2010

(65) Prior Publication Data

US 2010/0255136 A1    Oct. 7, 2010

(30) Foreign Application Priority Data

Apr. 7, 2009 (DE) .......................... 10 2009 016 783

(51) Int. Cl.
*B29C 45/80* (2006.01)
(52) U.S. Cl. ......... 425/145; 425/149; 425/150; 425/170
(58) Field of Classification Search .................. 425/145, 425/149, 150, 170, 808
See application file for complete search history.

(56) References Cited

U.S. PATENT DOCUMENTS

| | | | | |
|---|---|---|---|---|
| 4,828,769 A | * | 5/1989 | Maus et al. | 425/808 |
| 4,988,273 A | * | 1/1991 | Faig et al. | 425/145 |
| 5,137,661 A | * | 8/1992 | Kanome et al. | 264/145 |
| 5,147,659 A | * | 9/1992 | Watanabe et al. | 425/145 |
| 5,494,427 A | * | 2/1996 | Arai | 425/145 |
| 5,553,481 A | * | 9/1996 | Arai | 425/170 |
| 7,910,029 B2 | * | 3/2011 | Koumaru | 425/145 |

FOREIGN PATENT DOCUMENTS

| | | |
|---|---|---|
| DE | 36 37 897 | 5/1988 |
| DE | 103 37 785 | 11/2004 |
| DE | 10 2004 023 837 | 8/2005 |
| DE | 600 17 393 | 12/2005 |
| DE | 10 2004 056 209 | 6/2006 |

* cited by examiner

*Primary Examiner* — Timothy Heitbrink
(74) *Attorney, Agent, or Firm* — Lucas & Mercanti, LLP

(57) ABSTRACT

The invention relates to an injection unit (1) of an injection molding machine which is arranged movable relatively to a machine base (2) of the injection molding machine in an axial direction (A), wherein the injection unit (1) comprises a base body (3) at which a screw cylinder (4) is arranged, wherein a screw (5) is arranged rotatable and axially movable in the screw cylinder (4), wherein the screw (5) is connected with a drive element (6) at one of its axial ends which can rotate the screw and can also move it in axial direction (A) and wherein the drive element (6) comprises a gear element (7) which is movable in axial direction (A) as well as an actuator (8) which is in engagement with the gear element (7) and with the base body (3) and which can perform a translational movement in axial direction (A). To obtain an elementary design which guarantees a high precision the invention is characterized in that the base body (3) is designed as a one-piece block which has a plate-shaped reception (9) for the screw cylinder (4) at one of its axial ends and has a plate-shaped reception (10) for the actuator (8) at its opposite axial end.

12 Claims, 3 Drawing Sheets

INJECTION UNIT FOR AN INJECTION MOLDING MACHINE

CROSS-REFERENCE TO RELATED APPLICATION

This application claims the priority of DE 10 2009 016 783.8 filed Apr. 7, 2009, which is incorporated by reference herein.

BACKGROUND OF THE INVENTION

The invention relates to an injection unit of an injection molding machine which is arranged movable relatively to a machine base of the injection molding machine in an axial direction, wherein the injection unit comprises a base body at which a screw cylinder is arranged, wherein a screw is arranged rotatable and axially movable in the screw cylinder, wherein the screw is connected with a drive element at one of its axial ends which can rotate the screw and can also move it in an axial direction and wherein the drive element comprises a gear element which is movable in an axial direction as well as an actuator which is in engagement with the gear element and with the base body and which can perform a translational movement in an axial direction and wherein the base body is designed as a one-piece block which has a plate-shaped reception for the screw cylinder at one of its axial ends and has a plate-shaped reception for the actuator at its opposite axial end.

An injection unit of an injection molding machine according to this kind is known from DE 600 17 393 T2. Similar solutions show DE 10 2004 023 837 B3, DE 10 204 056 209 A1, DE 103 37 785 B3, DE 36 37 897 A1 and EP 0 998 380 B1. There, a compact design for the drive of a plasticizing and injection screw is obtained by designing a gear element in such a way that it can rotate the screw and can also move the screw in an axial direction. For the axial movement a spindle-nut-system is employed. The base body in which the gear element is arranged and on which also the screw cylinder is affixed is formed by two plates which are kept at a distance by arbors.

Such a design for the base body has prevailed but has also drawbacks: The base body is composed from a plurality of single parts, so a relative high expenditure in terms of manufacturing is necessary. By composing the parts, manufacturing tolerances are cumulated so that the precision of the guidance of the parts is limited which are moved translational in the direction of the longitudinal axis.

The pre-known solutions can only ensure the mounting of the spindle in the correct position to a certain degree which leads to a susceptibility of the spindles and thus to a reduced durability due to an angular misalignment which results from inclinations and bending. Especially, it was found out that the multi-part design of the base body leads to an inaccuracy by cumulating manufacturing tolerances which influences the precision of the position in a negative way of the parts which have to be supported.

As different injection molding parameters must be known for a precise and optimized controlling and feed-back-controlling respectively of the injection molding process and as especially the force which is acting on the screw in the direction of the longitudinal axis must be measured, solutions became known which try to determine the axial force in a sufficient precise way by employing a device with big expenditures what is detrimental.

BRIEF DESCRIPTION OF THE INVENTION

It is an object of the invention to further develop an injection unit of an injection molding machine of the kind mentioned above so that it becomes possible to obtain a more stable and more compact design of the base body.

The base body should be characterized by a high precision of the guidance of the elements which are moving translationally. Furthermore, it should be possible that the force which is acting on the screw especially in the direction of the longitudinal axis can be measured easily and precisely. Finally, the design should be simple so that a cost efficient production is possible.

The solution of this object according to the invention is characterized in that the two plate-shaped receptions are connected via at least two connection sections, wherein a measuring element for measuring the stress state in an axial direction is arranged at least one of the connection sections, wherein in the region of the measuring element the wall thickness of the connection section is reduced at least partially and wherein the measuring element comprises a strain gauge.

Thereby, the base body is preferably a cast part, especially a part made from spheroidal graphite cast iron or cast steel.

At least one of the connection sections can be designed as a plate which extends along the width of the base body horizontally and transversal to the axial direction. To reduce weight it can also be provided that at least one of the connection sections is designed as a rod which extends along the axial direction in a corner region of the base body; preferably four connection sections being designed as rods are arranged in the four corner regions of the base body.

The gear element can comprise two electric motors, especially two servo motors, which are arranged for the rotation of the screw and for the axial movement of the gear element in axial direction. The gear element is preferably movable relatively to the base body by means of a linear guiding in axial direction.

The actuator can be designed as a spindle-nut-system. The nut of the spindle-nut-system can be affixed at one of the plate-shaped receptions. The spindle of the spindle-nut-system can be rotated by the gear element.

The screw cylinder can be affixed at one of the plate-shaped receptions of the base body by means of a quick fastener to allow a quick change of the screw cylinder.

The injection unit can be movable in axial direction relatively to the machine base by means of a linear guiding.

With the proposed solution different benefits can be obtained:

At first, the very simple one-piece design is beneficial. If the base body is manufactured as a cast part—this solution is preferred—the mechanical machining can be significantly reduced compared with pre-known solutions. Thus, significantly fewer parts are employed to manufacture the base body. This saves costs.

Furthermore, a more stable base body is obtained compared with the design consisting of plates and arbors. Consequently, the guidance of the gear element can take place in a more precise way.

The measurement of the force acting in axial direction can take place in a very easy and precise way because only the linear elongation of a connection section must be determined what is possible by means of a stain gauge very precisely. Accordingly, it is possible to determine the injection force precisely and easily and to provide it to the machine control device. Especially, the measurement can be carried out in such a way that specific influences (e. g. the rotation of the spindle in its nut) and deviations in the planarity of the spindle relatively to the nut are not measured. Rather a pure linear measurement of forces can take place which is free from special effects. Accordingly, the measurement signal which is obtained by the proposed device is very consistent and the resolution of the measurement is good.

Manufacturing tolerances can be minimized by employing the one-piece base body according to the invention. The base body is designed in such a way that the bearing plane of the spindle nut moves parallel under load, i.e. no axial misalignment takes place under load. Accordingly, the correct position of the nut can be ensured easier as in the case of pre-known solutions.

In the drawings embodiments of the invention are depicted.

DETAILED DESCRIPTION OF THE INVENTION

Figure 1:
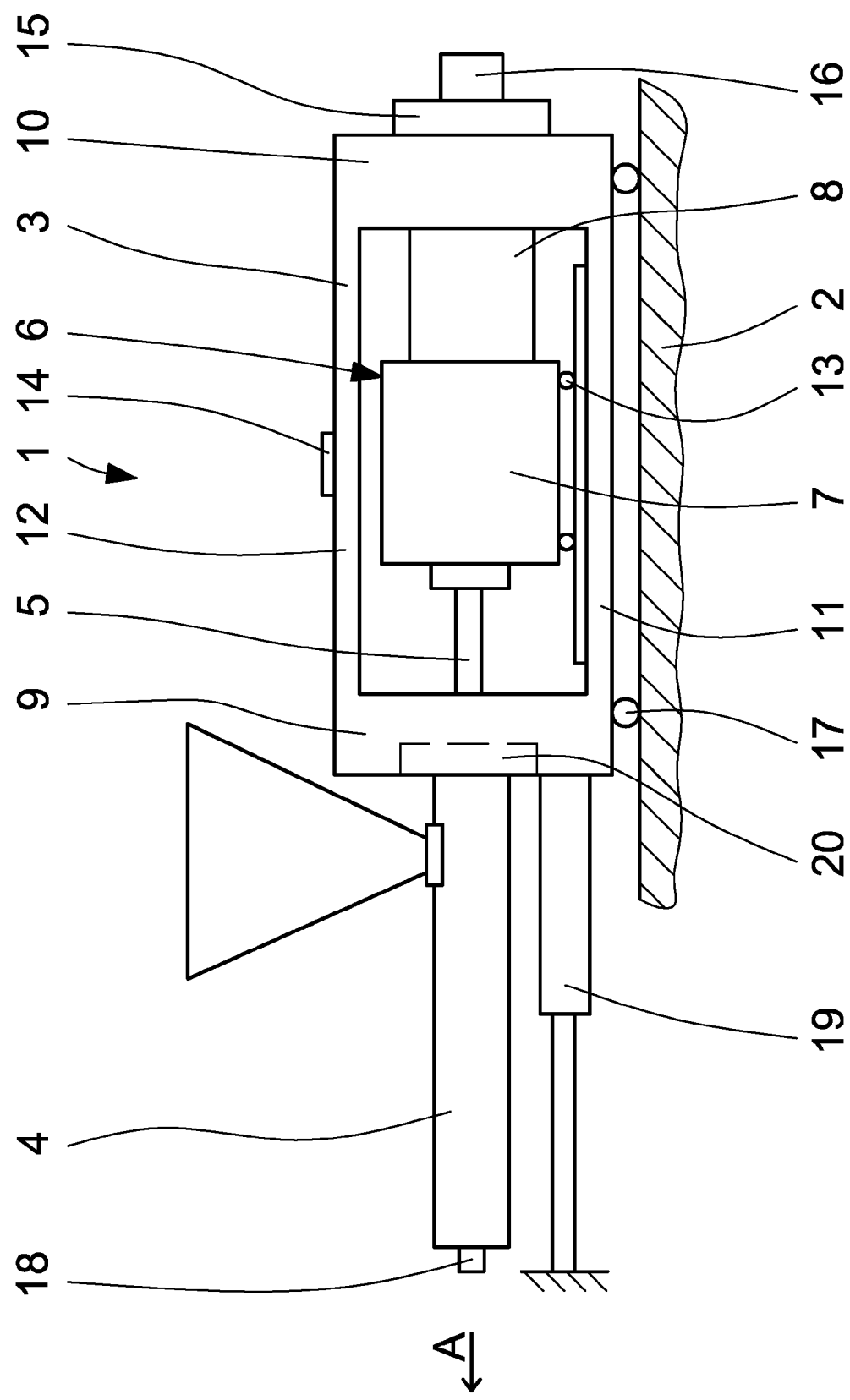
FIG. 1 shows schematically the side view of the injection unit of an injection molding machine, FIG. 2 show the base body of the injection unit in a perspective view according to a first embodiment of the invention and FIG. 3 show the base body of the injection unit in a perspective view according to a second embodiment of the invention.

In FIG. 1 a part of an injection molding machine is shown, namely the injection unit 1 of the machine. The unit is (at the left hand side in FIG. 1) attached to an injection molding tool (not shown), wherein plastic melt is injected into the mold cavity via a nozzle 18. The injection unit 1 is movable in axial direction A on a machine base 2 so that it can be driven to and from the mold respectively. Therefore, the injection unit 1 is arranged on the machine base 2 by means of a linear guiding 17 (which is depicted only schematically). The injection unit 1 can be driven into a desired position on the machine base 2 by means of an actuator 19.

The injection unit 1 has the following design: It has a base body 3 which carries and holds all essential components of the injection unit. The base body 3 is designed like a housing. It has two plate-shaped receptions 9 and 10 which are arranged at the ends seen in axial direction A. Those receptions are block-shaped in the embodiment. The receptions 9 and 10 are connected to another via connection sections 11, 12, 12'.

Figure 2:
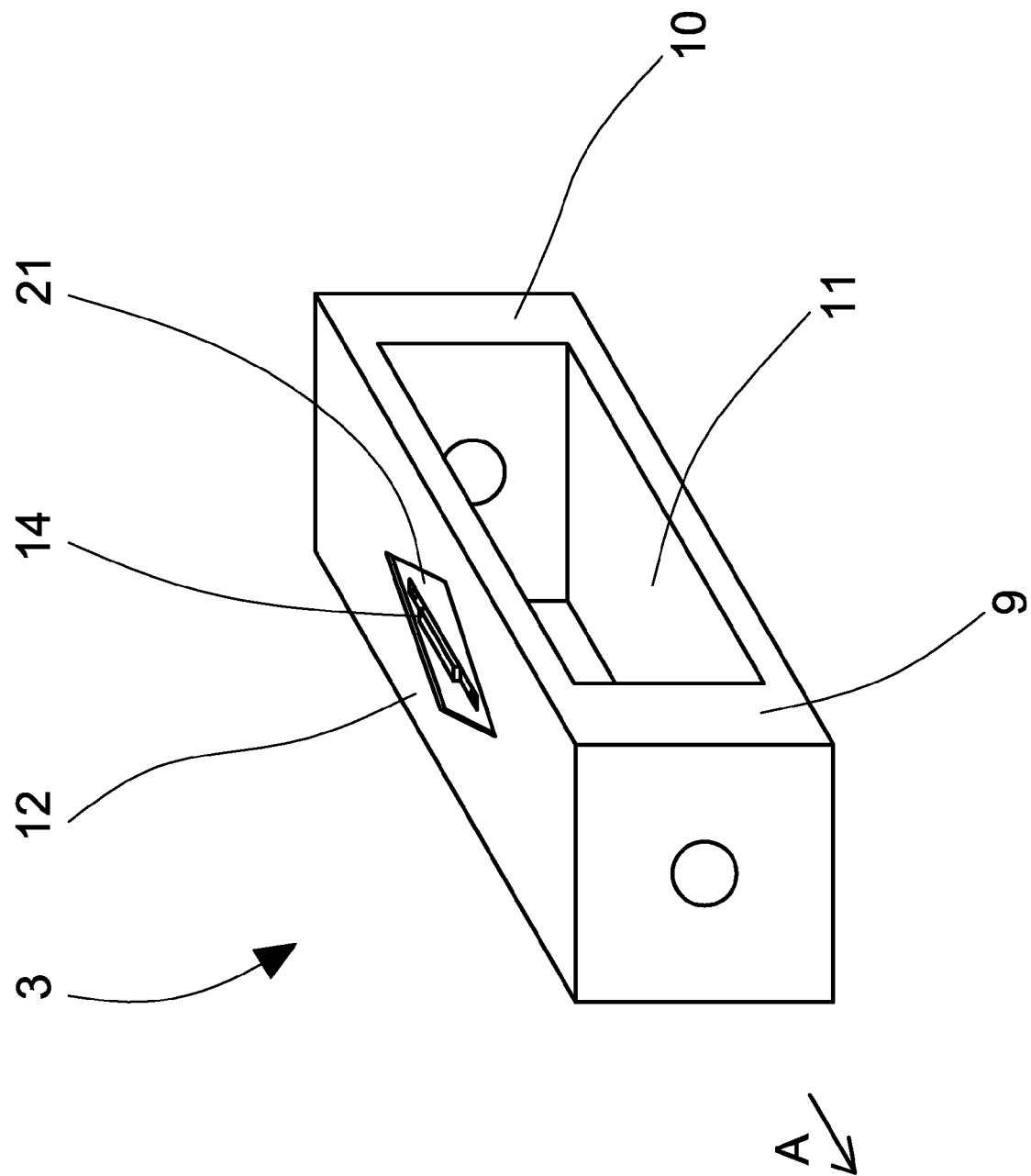

In FIG. 2 it can be seen that the connection sections 11 and 12 can each be designed plate-shaped, wherein one plate 11 extends in the bottom region and one plate 12 extends in the upper region between the two receptions 9 and 10.

Figure 3:
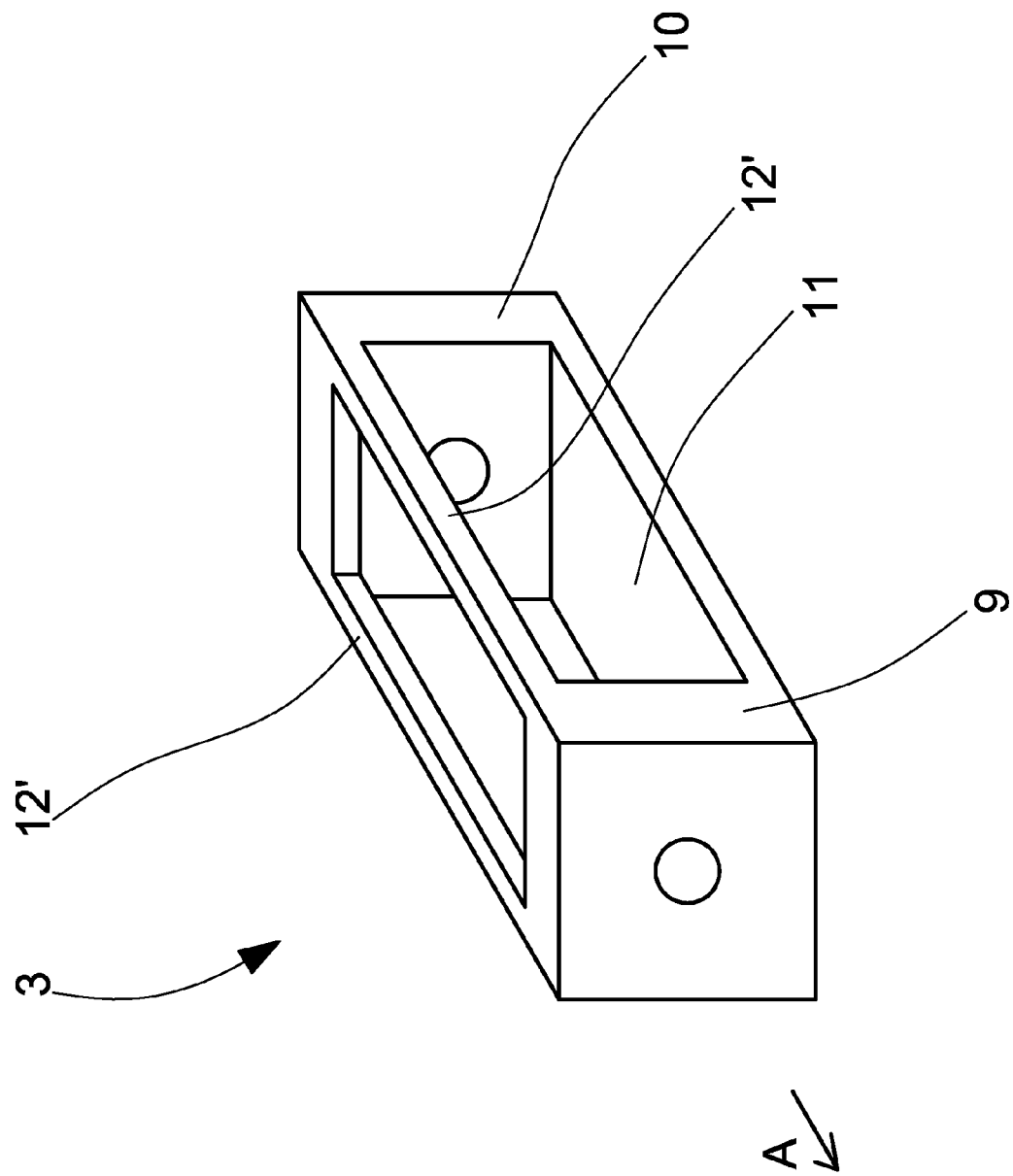

According to FIG. 3 it can also be provided that the connection sections 12' are designed rod-shaped. In the figure this is only arranged for the upper region of the base body 3; in the bottom region also here a plate-shaped connection section 11 is provided. To reduce weight it can also be provided that four rod-shaped connection sections 12' extend in the four corner regions between the receptions 9 and 10.

The left reception 9 in FIG. 1 is designed to hold a screw cylinder 4. This is provided in the present case in such a way that the screw cylinder 4 can be coupled with the reception 9 by means of a quick fastener 20. This allows a quick change of the screw cylinder 4. In the screw cylinder a plastification and injection screw 5 is arranged in known manner.

The screw 5 must rotate in known manner to plastify plastic material. For injection of the melt into the mould the screw 5 must be moved in axial direction A relatively to the screw cylinder 4.

This is done by a drive element 6 which consists of a gear element 7 and an actuator 8. The gear element 7 is arranged movable in axial direction A in the base body 3 by means of a linear guiding 13. The movement is caused by the actuator 8 which is presently designed as a spindle-nut-system. An electrical servo motor which is not shown and which is arranged in the region of the reference numeral 6 rotates a spindle 16 which penetrates the nut 15. The nut 15 is affixed torque proof in the reception. Accordingly, if the spindle 16 is rotated the gear element 7 is moved in axial direction A relatively to the base body 3.

The gear element 7 provides for the rotation of the screw 5 for which a respective electrical servo motor is arranged. Details of the gear element 7 are not observable from FIG. 1. A possible design of the gear element is disclosed in detail in EP 0 998 380 B1; reference is made to this document.

It is important for the controlling of the injection molding process that the axial force acting in axial direction A is known by which the screw 5 presses the melt into the mold. If this axial force is known, the injection pressure can be determined by the cross sectional area of the screw 5 which is also known.

For a simple but also precise measurement of the force a measuring element 14 being a strain gauge is arranged on at least one of the connection sections 11, 12, 12'. As can be seen in FIGS. 1 and 2 the strain gauge 14 is arranged approximately centered along the extension of the connection section 12 in axial direction A. In the embodiment the strain gauge is arranged at the outer surface of the connection section 12. Thereby, it is provided that the thickness of the connection section 12 is reduced in the region in which the measuring element 14 is arranged. This is marked by the reference numeral 21 (rhombical region). By this design it is achieved that a region is established within the connection section 12 which has a higher strain during load so that the measurement by means of a strain gauge can take place with a higher resolution with an improved precision. Instead of the reduction of the wall thickness it is also possible to provide a cut-out which is then bridged band-like by the measuring element (strain gauge).

By measurement of the elongation which can be measured in a way the axial force can be determined. It is beneficial that the acting axial force moves the nut 15 on its reception 10 parallel and no axial misalignment is existent under load. Thus, under load a pure axial movement takes place and the effective and unaltered acting axial force can be exactly detected by the strain gauge 14.

The injection molding machine is presently designed as a so-called electrical machine, i.e. all required movements are carried out by means of electric motors (servo motors).

LIST OF REFERENCE NUMERALS

1 Injection unit
2 Machine base
3 Base body
4 Screw cylinder
5 Screw
6 Drive element
7 Gear element
8 Actuator
9 Plate-shaped reception
10 Plate-shaped reception
11 Connection section
12 Connection section
12' Connection section
13 Linear guiding
14 Measuring element (strain gauge)
15 Nut
16 Spindle 17 Linear guiding
18 Nozzle
19 Actuator
20 Quick fastener
21 Region of reduced wall thickness
A Axial direction

The invention claimed is:

1. Injection unit of an injection molding machine which is arranged movable relatively to a machine base of the injection molding machine in an axial direction, wherein the injection unit comprises:

a base body having two axial ends at which a screw cylinder is arranged at one of the axial ends, wherein a screw is arranged rotatable and axially movable in the screw cylinder, wherein the screw is connected with a drive element at one of the axial ends which can rotate the screw and can also move it in an axial direction, wherein the drive element comprises a gear element which is movable in an axial direction as well as an actuator which is in engagement with the gear element and with the base body and which can perform a translational movement in an axial direction and wherein the base body is designed as a one-piece block which has a plate-shaped reception for the screw cylinder at one of the axial ends and has a plate-shaped reception for the actuator at the opposite of one of the axial ends, wherein the two plate-shaped receptions are connected via at least two connection sections, wherein a measuring element for measuring the stress state in axial direction is arranged at least one of the connection sections, wherein in the region of the measuring element the wall thickness of the connection section is reduced at least partially and wherein the measuring element comprises a strain gauge.

2. Injection unit according to claim 1, wherein the base body is made from spheroidal graphite cast iron.

3. Injection unit according to claim 1, wherein at least one of the connection sections is designed as a plate which extends along the width of the base body horizontally and transversal to the axial direction.

4. Injection unit according to claim 1, wherein at least one of the connection sections is designed as a rod which extends along the axial direction in a corner region of the base body.

5. Injection unit according to claim 4, wherein four connection sections being designed as rods are arranged in the four corner regions of the base body.

6. Injection unit according to claim 1, wherein the gear element comprises two electric motors, especially two servo motors, which are arranged for the rotation of the screw and for the axial movement of the gear element in an axial direction.

7. Injection unit according to claim 1, wherein the gear element is movable relatively to the base body by a means for linear guiding in an axial direction.

8. Injection unit according to claim 1, wherein the actuator is designed as a spindle-nut-system.

9. Injection unit according to claim 8, wherein the nut of the spindle-nut-system is affixed at one of the plate-shaped receptions.

10. Injection unit according to claim 8, wherein the spindle of the spindle-nut-system can be rotated by the gear element.

11. Injection unit according to claim 1, wherein the screw cylinder is affixed at one of the plate-shaped receptions of the base body by a means for quick fastening.

12. Injection unit according to claim 1, wherein the injection unit is movable in axial direction relatively to the machine base by a means for linear guiding.

* * * * *